United States Patent [19]
Matter et al.

[11] Patent Number: 5,392,437
[45] Date of Patent: Feb. 21, 1995

[54] METHOD AND APPARATUS FOR INDEPENDENTLY STOPPING AND RESTARTING FUNCTIONAL UNITS

[75] Inventors: Eugene P. Matter, Folsom; Yahya S. Sotoudeh, Santa Clara, both of Calif.; Gregory S. Mathews, Boca Raton, Fla.

[73] Assignee: Intel Corporation, Santa Clara, Calif.

[21] Appl. No.: 973,077

[22] Filed: Nov. 6, 1992

[51] Int. Cl.⁶ .................... G06F 1/32; G06F 1/04
[52] U.S. Cl. .................... 395/750; 395/550; 395/800
[58] Field of Search ............ 395/750, 550, 575, 800

[56] References Cited

U.S. PATENT DOCUMENTS

| | | | |
|---|---|---|---|
| 3,919,695 | 11/1975 | Gooding | 395/550 |
| 4,293,927 | 10/1981 | Hoshii | 395/750 |
| 4,615,005 | 9/1986 | Maejima | 395/550 |
| 4,758,945 | 7/1988 | Remedi | 395/750 |
| 4,814,591 | 3/1989 | Nara et al. | 235/380 |
| 5,167,024 | 11/1992 | Smith et al. | 395/375 |

FOREIGN PATENT DOCUMENTS

451661A2 10/1991 European Pat. Off. ....... G06F 1/32

*Primary Examiner*—Jack B. Harvey
*Assistant Examiner*—Glenn A. Auve
*Attorney, Agent, or Firm*—Blakely, Sokoloff, Taylor & Zafman

[57] ABSTRACT

A mechanism for powering down a functional unit on an integrated circuit having multiple functional units. Some of the functional units are clocked independently of each other. A method and mechanism for indicating to the functional unit whether it is required for use. Also included is a method and mechanism for powering down the functional unit transparent and independent of the rest of the functional units when the functional unit is not required for use.

32 Claims, 8 Drawing Sheets

METHOD AND APPARATUS FOR INDEPENDENTLY STOPPING AND RESTARTING FUNCTIONAL UNITS

FIELD OF THE INVENTION

The present invention relates generally to the field of power management of integrated circuits; particularly, the present invention relates to power management circuits which independently stop and restart functional units.

BACKGROUND OF THE INVENTION

With the emergence of the laptop computer market, there has been a desire for a new personal computer (PC) that operates at a very low power. Although recently the PC market has been attempting to move to power supply voltages of 3 volts, instead of 5 volts, the focus of reducing power consumption has been centered in the area of when a chip is in a state of little or no activity. Ideally, when a chip is not currently active, it would be beneficial to reduce the power consumption, thereby operating at a lower power than when the chip is constantly drawing power. One method of achieving low power consumption in chips is to employ power management circuits. Power management circuits put the chip into a state that draws little or no current, even though the supply voltage remains coupled to the chip. This state is known as power down. Power management circuits are particularly advantageous to utilize when a chip is not currently active.

One type of prior art power management circuit utilizes external counters to detect activity in the chip. These counters are usually timers keyed to the last access of the chip. These timers act as retriggerable 1-shots, such that when no activity occurs for a predetermined period of time, the chip is allowed to power down. One problem with such a power management scheme is that external control of the power management circuit (i.e., via the counter) is required. When external counters signal that the chip may be put into the powered down state, or mode, an external switch turns off the power. Hence, actually entering the power down mode is externally controlled. Furthermore, these power management circuits are not transparent to software controlling the chip.

In order to put a chip into the power down mode using external circuitry, the clock must be stopped. In order to stop the clock or at least gate the clock, a bus cycle must be launched or a process must be physically executed at the bus cycle level. The absence of any bus cycles being executed (e.g., through default) is an indication that the device can be shut off. Once a bus cycle did occur to a device that was powered off, a mechanism is required for the clock to start. Also, the device would require a means of recovering quickly enough to respond to the cycle. Alternatively, if an access to the powered down or stopped device occurred, the processor might have to execute an instruction twice so that a powered down device would have time to respond. Although these mechanisms work, they are very complicated.

Portable PCs place a high premium on reducing power consumption. The primary mechanism to reduce the active power consumption is to reduce the number of transitions of internal logic, essentially by dividing or stopping the clock. On some PC chips, such as a microprocessor chip, there are numerous functional units. Each functional unit is responsible for performing a different function. At any given time, some of the functional units may be idle and not performing their designated functions, while others are performing their functions. Unnecessary clocking of unused functional units of a processor may contribute to excessive power consumption. For instance, in a processor having a separate floating point unit, when the floating point unit is not executing any floating point instructions, the clocking to the floating point unit causes power to continue to be consumed.

In the prior art, the control of the clock of the floating point functional unit is limited by the minimum operating frequency of the external math co-processor. In other words, shutting off the clock of the floating point unit could not be done independently of the clock of the external math co-processor, and vice versa. Clock control is performed by externally dividing or stopping the floating point clock using software drivers under program or basic input/output system (BIOS) control. In the case of the external math co-processor, stopping the floating point clock cannot be performed independently of stopping the central processing unit (CPU) clock. In the prior art, dividing or stopping the external floating point clock also requires time-out values to be used or programmed. The purpose of these time-out values is to stop the clock after some arbitrary time has elapsed since the last clock to the functional unit. These time-out values are arbitrary. For instance, if 1024 CPU phases have elapsed since the last clock to the functional unit, the clock can be stopped or divided down. Furthermore, when the external clock is stopped, the mechanism to restart the floating point clock requires support from a companion, input/output (I/O) device. In other words, an external I/O device is required to begin the proper clocking of the floating point unit.

In the prior art, to stop the clock, a halt instruction or I/O bus cycle is required. This instruction or I/O bus cycle is used by the external I/O device to generate a stop clock signal back to the CPU. A floating point unit clock cannot be independently or transparently stopped unless the CPU clock is also stopped. The CPU and floating point clock are restarted by an interrupt which breaks the CPU out of the halt condition. The stop clock and interrupt to restart the clock introduce additional latency in the system, due to the logic causing delay in the system and the program execution.

As will be shown, the present invention provides a mechanism that allows on-chip functional units to be automatically stopped when not being used and automatically restarted when being prepared for use. The present invention provides a mechanism for power management which requires no external software control.

SUMMARY OF THE INVENTION

A mechanism and method for powering down a functional unit on an integrated circuit is described. The integrated circuit has multiple functional units. Each of the functional units is clocked by its own independent clock. The mechanism and method provide the functional unit with information regarding whether the functional unit is required for use. The present invention also includes a mechanism for powering down the functional unit transparently to and independently of the remainder of the functional units on the chip when the functional unit is not required for use. In this instance, the independent clock of the functional unit is stopped when the functional unit is not in use and automatically started when the functional unit is required for use.

In the currently preferred embodiment, the floating point unit of the microprocessor is stopped when the floating point unit is not currently executing a floating point instruction or is not going to execute a floating point instruction. Whether the floating point unit is going to execute a floating point instruction is determined by advanced information from the microcode unit and the decoder unit of the microprocessor.

BRIEF DESCRIPTION OF DRAWINGS

The present invention will be understood more fully from the detailed description given below and from the accompanying drawings of the preferred embodiments of the invention, which, however, should not be taken to limit the invention to the specific embodiments, but are for explanation and understanding only.

DETAILED DESCRIPTION OF THE INVENTION

Figure 1:
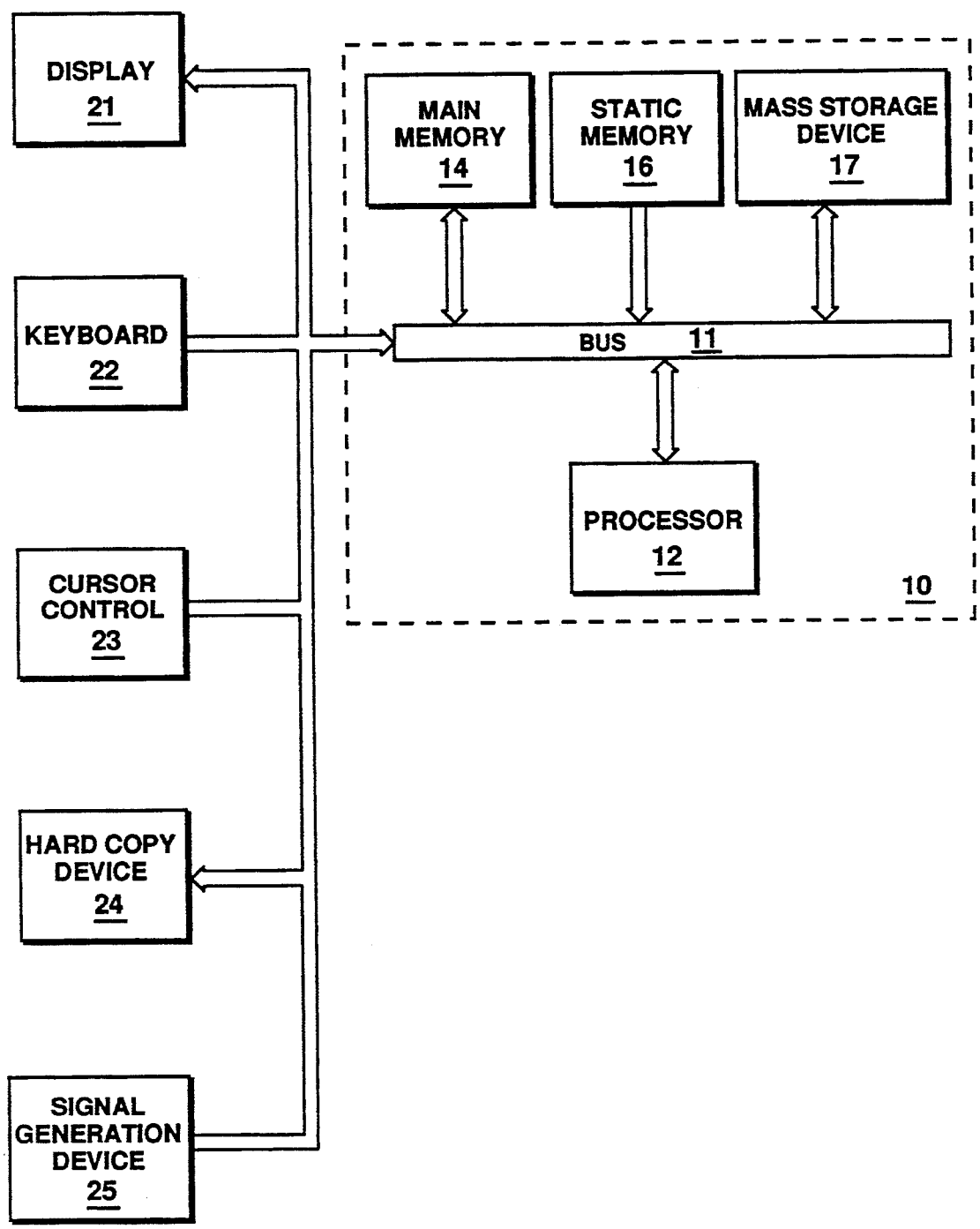
FIG. 1 is a block diagram of the computer system of the present invention.

A method and mechanism for independently stopping and restarting functional units in an integrated circuit is described. In the following description, numerous specific details are set forth such as specific logic gates, functional unit types, signal names, etc., in order to provide a thorough understanding of the present invention. It will be obvious, however, to one skilled in the art that the present invention may be practiced without these specific details. In other instances, well-known operations have not been described in detail to avoid unnecessarily obscuring the present invention.

The present invention is employed in conjunction with an on-chip functional unit. A functional unit is a portion of an integrated circuit which has a designated function. Examples of functional units are the integer and floating point instruction execution units, etc. The present invention is also applicable to additional on-chip core logic, such as bus controllers and memory controllers, as well as other logic which is integrated on the same die. The present invention allows an on-chip functional unit to be powered down when not required for use. A functional unit is not required for use when it is not currently performing its function and is not going to be performing its function in the near future (i.e., when it is not preparing for an imminent use). For example, if a floating point instruction is being decoded, then barring any intervening halt or interrupt condition for the processor, the use of the floating point unit is imminent. Some functional units must prepare for their operation. Therefore, if their use is imminent, the unit must prepare to perform its function.

The placing of a functional unit in the power down state is accomplished by starting and stopping of the clock to the functional unit. According to the present invention, the clock to the functional unit is automatically stopped when the functional unit is not being used and automatically restarted during its preparation for use. The present invention can also be utilized in conjunction with multiple functional units on an integrated circuit. In this case, the clock to each functional unit is stopped automatically when its respective functional unit is not performing its function (i.e., it is not being used) and it is not being prepared for use. Therefore, the present invention allows functional units that are not required for use to be powered down (i.e., placed in the powered down state).

The present invention permits some functional units to be powered down while leaving the remaining functional units powered up by using a distributed clock system. In the currently preferred embodiment, the distributed clock system provides each functional unit or some preset number of functional units with their own individual clocks. By turning off these individual clocks, the functional unit can be powered down. It should be noted that the gating of the clock as a means to shut off the clock to a functional unit creates additional latency problems as well as phase timing problems. Therefore, although the clock could be gated as a means of stopping the clock, in the preferred embodiment, the present invention shuts off each functional unit's clock as the means to power down the functional unit to avoid incurring the additional latency problems.

The present invention determines when functional units are required for use (i.e., being used or prepared for use) by using internal interfaces. The present invention defines an interface to detect when the functional unit is idle. In this manner, the present invention provides an internal interface to detect when a new bus cycle to the functional unit requests its use and when that cycle has occurred. This allows the functional unit to determine when it should prepare for use. In the currently preferred embodiment, this interface comprises a signal. The present invention also defines an internal interface between the functional unit and the clock generator for the functional unit to control the stopping and restarting of the functional unit's clock. In the current preferred embodiment, this internal interface comprises a signal from the functional unit which enables and disables the clock.

Overview of the Computer System of the Present Invention

Referring to FIG. 1, an overview of a computer system of the present invention is shown in block diagram form. It will be understood that while FIG. 1 is useful for providing an overall description of the computer system of the present invention, a number of details of the system are not shown. As necessary for disclosure of the present invention, further detail is set forth with reference to the other figures provided with this specification. Further, the present invention is described with reference to its preferred embodiment; alternative embodiments which may be conceived by one of ordinary skill in the art are considered within the scope of the claims set forth below.

As illustrated in FIG. 1, a computer system, as may be utilized by the preferred embodiment of the present invention, generally comprises a bus or other communication means 11 for communicating information, a processing means 12 coupled with bus 11 for processing information, a Random Access Memory (RAM) or other dynamic storage device 14 (commonly referred to as a main memory) coupled with bus 11 for storing information and instructions for processing means 12, a Read Only Memory (ROM) or other non-volatile storage device 16 coupled with bus 11 for storing non-volatile information and instructions for processing means 12, a data storage device 17, such as a magnetic disk and disk drive, coupled with bus 11 for storing information and instructions, a display device 21, such as a cathode ray tube, liquid crystal display, etc., coupled to bus 11 for displaying information to the computer user, an alpha-numeric input device 22 including alpha-numeric and other keys, etc., coupled to bus 11 for communicating information and command selections to processor 12 and a cursor control 23 for controlling cursor movement. The system also includes a hard copy device 24, such as a plotter or printer, for providing a visual representation of the computer images. Hard copy device 24 is coupled with processor 12, main memory 14, non-volatile memory 106 and mass storage device 17 through bus 11. Finally, the system includes a sound recording and playback device 25 for providing audio recording and playback.

Of course, certain implementations and uses of the present invention may not require nor include all of the above components. For example, in certain implementations a keyboard and cursor control device for inputting information to the system may not be required. In other implementations, it may not be required to provide a display device for displaying information.

Figure 2:
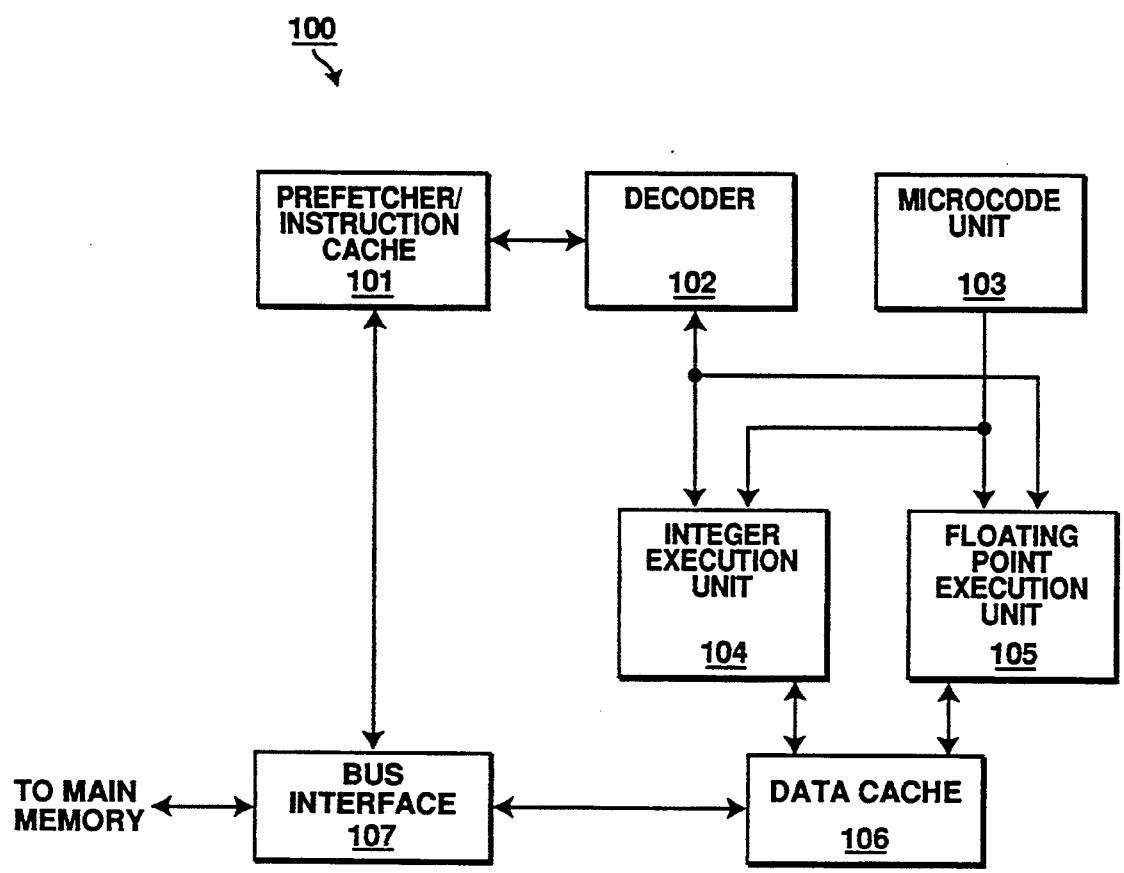
FIG. 2 is a block diagram of the microprocessor of the present invention.

FIG. 2 depicts a block diagram of the microprocessor 100 of the present invention. Referring to FIG. 2, microprocessor 100 generally comprises prefetcher or instruction cache means 101 for prefetching instructions from the main memory to be executed by a microprocessor 100, an instruction decoder 102 coupled with prefetcher 101 for decoding the instructions fetched by prefetcher 101, and microcode unit 103 for converting the instructions from instruction cache 101 into microcode which is capable of being executed by microprocessor 100. Decoder 102 and microcode unit 103 supply the integer pipeline execution unit 104 and the floating point pipeline execution 105 with integer and floating point instructions, respectively, for execution. Integer pipeline execution unit 104 and floating point pipeline execution unit 105 are coupled to and have access to data cache 106 when executing the instructions.

To perform their requisite functions, the integer pipeline execution unit 104 and floating point pipeline execution unit 105 contain sets of address generation logic, arithmetic logic, and cache memory interfaces. The memory interface of both integer and floating point pipeline execution units 104 and 105 are coupled to data cache 106. The execution pipeline units 104 and 105 use the cache memory interface to access data cache 106 for recently used data which data cache 106 temporarily stores until the data is written back to the main memory of the computer system. Data cache 106 is also coupled with memory bus interface 107 which provides the interface between microprocessor 100 and the main memory of the computer system. Bus interface 107 is also coupled to and allows prefetcher 101 and data cache 106 to access the main memory of the computer system.

Of course, certain implementations and uses of the present invention may not require nor include all or be solely limited to the above components. For example, certain implementations of microprocessor 100 may have more or less execution pipeline units.

In the currently preferred embodiment, the present invention provides a mechanism that allows the on-chip floating point unit clock to be automatically stopped when the floating point unit is idle and automatically restarted when floating point instructions are being prepared for execution. The floating point busy and idle detection is monitored for each bus request internally. Thus, the present invention requires no external software or hardware interfaces and is, therefore, 100% transparent to the remainder of the functional units of microprocessor 100. In the prior art, since the floating point unit consumes approximately 45 to 80 mA of current when idle, automatically stopping the clock of the floating point unit when idle reduces that amount of power consumption by that amount.

In the present invention, an internal interface between the floating point unit and the microcode unit indicates when the floating point unit is idle. In the currently preferred embodiment, this internal interface comprises a signal. In the currently preferred embodiment, this signal is the FBUSY signal. In the present invention, an internal interface between the microcode unit and the floating point unit indicates when a new floating point unit bus cycle request has occurred. In the currently preferred embodiment, this internal interface comprises signals which indicate the beginning of a new floating point instruction and the ending of a floating point instruction. It should be noted that similar interfaces can be provided between other functional units to indicate when a particular functional unit is busy or is going to be required for use.

The present invention also defines an internal interface between the floating point unit and the clock generator which allows the floating point unit to independently and automatically stop and restart the floating point unit. In the currently preferred embodiment, this internal interface comprises a signal from the floating point unit. In the currently preferred embodiment, this signal is the FCLKEN signal. The floating point unit clock will automatically be stopped if there is no new floating point instruction prepared for execution and when any current floating point instruction has completed execution. The floating point clock control signal (i.e., FCLKEN) may be asserted or deasserted on a cycle-by-cycle basis.

In the currently preferred embodiment, the floating point unit is integrated on the same die of the microprocessor. The floating point unit clock is derived from the primary CPU clock input. In the currently preferred embodiment, supplying various functional units with their own independent clock is accomplished by driving multiple internal clock generators with their own independent clock control from a single input. The present invention also provides the capability to reduce the stop clock latency to the floating point unit, independently stop and restart the floating point unit clock and remove dependencies for floating point control from an external companion I/O device, which typically utilized a programmable timer as a means to determine when to stop a functional unit.

Figure 3:
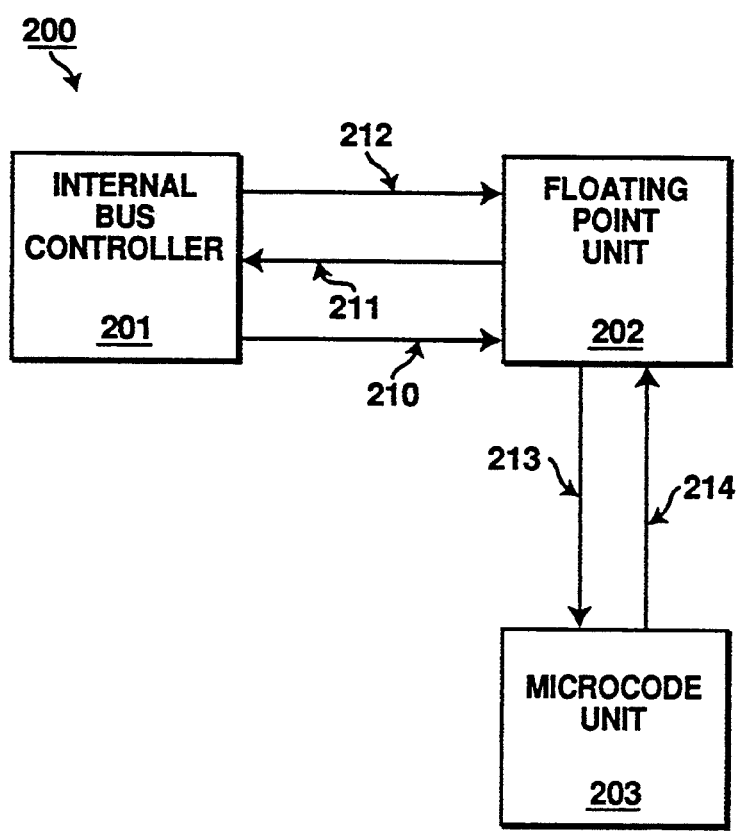
FIG. 3 is a block diagram of the microprocessor of the currently preferred embodiment depicting a specific application of the present invention.

FIG. 3 depicts a block diagram of a microprocessor of the currently preferred embodiment. Referring to FIG. 3, internal bus controller 201 is shown coupled to floating point unit 202. In the currently preferred embodiment, internal bus controller 201 generates the clock signals to the functional units. In the currently preferred embodiment, internal bus controller 201 sends clock phase signals NPXPH1 and NPXPH2 to floating point unit 202 via lines 210. Also bus controller 201 is coupled to receive the floating point clock enable signal (FCLKEN) from floating point unit 202 via line 211. Internal bus controller 201 outputs a floating point stop clock disable signal, BNSTPDIS, via line 212 to floating point unit 202 which is coupled to receive it. Microcode unit 203 is coupled to receive an FBUSY signal via line 213 indicating whether the floating point unit 202 is busy or not. Also floating point unit 202 is coupled to receive signals on lines 214 from microcode unit 203 indicating whether a new floating point unit instruction is in the pipeline and also indicating when that floating point instruction ends. In the currently preferred embodiment, lines 214 comprise four signals: CNEWI, CLMI, CPNEWI, and GLCN. Microcode unit 203 checks the instructions decoded to determine when floating point instructions are being executed, when they have completed execution, and to determine when they are being prepared for execution to automatically stop and restart the floating point clock.

Internal bus controller 201 provides floating point unit 202 with the phase clock signal NPXPH1 and NPXPH2. Internal bus controller 201 includes a clocking system, wherein a clock unit having individual clock generators develops separate internal clock signals for the data cache, the CPU, the floating point unit, the in-circuit-emulator (ICE) circuitry and the bus of the microprocessors. The ICE circuitry provides emulation information on the CPU's execution. In other words, the ICE circuitry monitors the bus cycles and does not affect the overall functionality of the chip. Each separate clock is routed to the internal CPU core units. Each individual clock can be stopped when the unit is not in use and automatically started when the unit is prepared for use.

In the currently preferred embodiment, the clock signals of floating point unit 202 are disabled by the clock enable signal FCLKEN. In the currently preferred embodiment if the FCLKEN signal is low (inactive), then the clock is disabled, while if the FCLKEN signal is high (active), then the clock is enabled. The clock is disabled when floating point unit 202 is not currently executing an instruction and is not preparing to execute an instruction. Floating point unit 202 is not preparing for use (i.e., not preparing to execute an instruction) when a CLMI signal or GLCN signal indicates that microcode unit 203 is finished with the floating point instruction and the clock can be stopped. Thus, the clock of floating point unit 202 will automatically be stopped if there is no new floating point instruction prepared for execution and when any current floating point instruction has completed execution. In the currently preferred embodiment, this occurs on a cycle-by-cycle basis. Thus, the clock to the floating point unit may be stopped on a cycle-by-cycle basis.

The floating point unit's busy and idle detection is monitored for each bus request internally. The CNEWI and CPNEWI signals from microcode unit 203 indicate that a floating point instruction is ready for execution. If floating point unit 202 is not ready to execute an instruction, then the FBUSY signal will be high. In the currently preferred embodiment, the FBUSY signal will be high, indicating that floating point unit 202 is not ready to execute an instruction, when floating point unit 202 is currently executing an instruction requiring multiple cycles or because the clock to floating point unit 202 had been stopped. Therefore, in response to a CNEWI or CPNEWI signal from microcode unit 203, the FBUSY signal indicates that floating point unit 202 is not ready to execute an instruction. If the FBUSY signal is asserted due to the clock being stopped and floating point unit 202 receives either a CNEWI or CPNEWI signals, floating point unit 202 enables the clock from internal bus controller 201 using the clock enable signal FCLKEN. When the clock is restarted, floating point unit 202 releases the FBUSY signal. Floating point unit 202 is then ready to execute instructions.

Internal bus controller 201 also issues a stop clock disable signal BNSTPDIS via line 212 which allows for enabling or disabling the automatic stopping and restarting of the floating point unit clock. In the currently preferred embodiment, when the BNSTPDIS signal is high, automatic stopping and restarting of the floating point clock due to inactivity is disabled, while when the BNSTPDIS signal is low, the automatic stopping and restarting of the floating point clock due to inactivity is enabled. In the currently preferred embodiment, a configuration register bit is utilized to implement the disabling and enabling of the automatic stopping and restarting of the independent clock.

It should be noted that in the currently preferred embodiment, any division of the floating point unit clock and the stop clock operation track each other by default. Anytime the NPX clock (i.e., the clock from the primary CPU clock input) is running, if the CPU clock is divided, then the clock of the floating point unit is also divided. Also in the currently preferred embodiment, if the CPU clock is stopped, the floating point clock is also stopped.

In the present invention, the conversion of macroinstructions into microcode is accomplished, to some extent, using a programmable logic array (PLA). In the currently preferred embodiment, restarting of the floating point unit clock requires a signal output from the entry point PLA that designates floating point instructions. In the currently preferred embodiment, the CNEWI and CPNEWI signals provide the designation. This signal follows a parallel route to the microcode unit so that it is available to the floating point unit at the same time as the entry point is fed from the read-only memory (ROM) storing the microcode. This signal would be optionally provided to eliminate the one cycle penalty for starting the floating point unit clock and handle jump cases and microcode freezes. In this manner, the starting of the floating point clock would occur at the same time a new floating point instruction gets to the floating point unit.

In the currently preferred embodiment, the stop clock logic is located in the floating point unit 202 and receives the following input signals: CNEWI, CPNEWI, BRESET, CLMI, GLCN, PH1, PH2, FESBITNN, CMD[7:7], BDFP, BNSTPDIS, CICMD, BTM, FERROR, BUSYI.

The CNEWI signal indicates that the first microinstruction for a new floating point macro-instruction is available. The CNEWI signal is responsible for starting the clock when it is stopped. The stop clock logic also receives the CPNEWI signal. The CPNEWI indicates the availability of the first micro-instruction of a new pseudo- (i.e., administration) floating point micro-instruction. In other words, these are the pseudo-instructions which the floating point unit is capable of executing. As with the CNEWI signal, the CPNEWI signal also triggers the starting of the clock when it is stopped.

A BRESET signal is used to reset the floating point unit and start the clock. A CLMI signal indicates the last micro-instruction for the current macro-instruction arrives at the floating point unit. The CLMI signal follows the CNEWI signal. The falling edge of the CLMI signal is one of the conditions to stop the clock. The GLCN signal is the last cycle next signal. The next cycle could be the last cycle of an instruction. The falling edge of the GLCN signal is one of the conditions to stop the clock. In the currently preferred embodiment, in order for the clock to stop, the GLCN signal is asserted after the CPNEWI has been asserted.

The stop clock logic also receives the two phase clock signals, PH1 and PH2 of the clock for the microprocessor. These free running PH1 and PH2 phase clock signals are used in order to update the floating point bus which operates when the floating point unit is powered down. Also, a portion of the clock stop logic uses these clocks. The FESBITNN signal causes the external floating point error pin to go active when a floating point error occurs. In the currently preferred embodiment, the FESBITNN signals should be inactive for the clock to stop. An error signal, FERROR, is the floating point unit error signal. The FERROR signal is driven high when the floating point unit requires a pre-execution assist or encounters a post-execution high. For example, a pre-execution assist occurs when the floating point unit is loaded with data or information which it cannot accommodate. A post-execution high occurs when the operation of the floating point unit results in an illegal result (e.g., divided by zero). In the currently preferred embodiment, the FERROR signal should be inactive for the clock to stop as well.

The CMD [7:7] is the most significant bit of an instruction and can be used to indicate whether an instruction is a floating-point operation or not. The BDFP signal is a signal which disables the floating point unit when it is high. In the currently preferred embodiment, the BDFP is always a logical 0 (i.e., low or inactive). If the BDFP is tied high, then the floating point unit is disabled. The BNSPTDIS signal disables the stop clock logic externally when the signal transitions from 0 to 1. The CICMD signal disables the stop clock logic when the chip is in the ICE mode (i.e., on-chip emulation mode to determine the execution performance of the CPU). The BTM signal disables the stop clock logic when the CPU is in the built-in self-test mode.

In the currently preferred embodiment, the FBUSY signal indicates that one of two conditions exist. If the FBUSY signal is high, the floating point unit is either executing a multi-clock floating point instruction or it is in the idle state. In both cases, microcode unit 203 waits until this signal goes to the inactive state before sending a new micro-instruction. The FCLKEN signal enables the clock of internal bus controller 201. If the FCLKEN signal is high, internal bus controller 201 generates the floating point unit clock. Otherwise, internal bus controller 201 stops the clock. The BUSYI signal is a signal that floating point unit 202 raises high when receiving a multi-clock floating point instruction.

In the currently preferred embodiment, the BUSYI signal is raised according to whether a bit in the floating point instruction is set, thereby indicating that the instruction requires multiple clock cycle for execution.

Figure 4A:
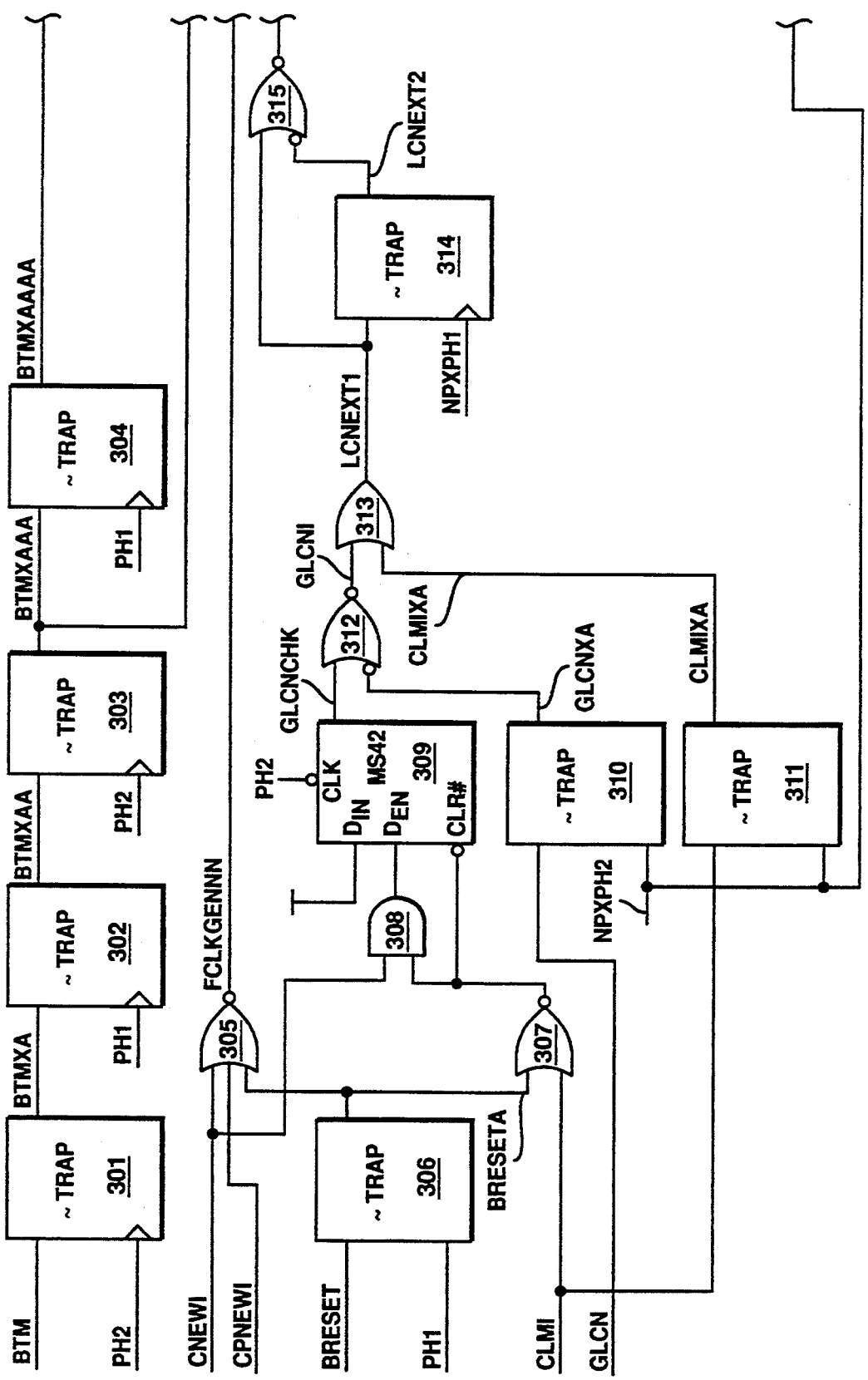
FIGS. 4A and 4B are circuit schematics of the stop clock logic of the present invention.
Figure 4B:
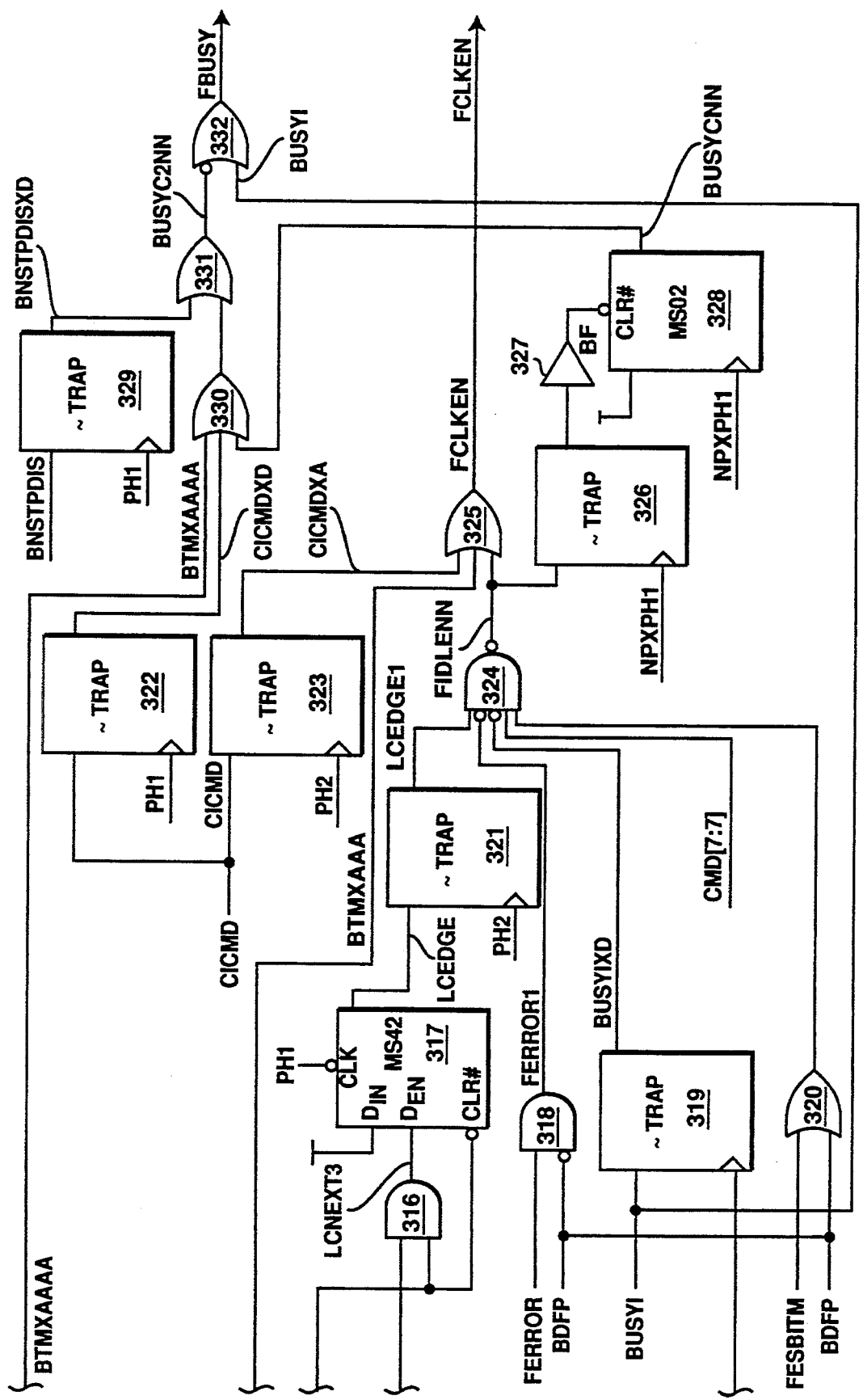

The stop clock logic for the present invention is shown in FIGS. 4A and 4B. Referring to FIGS. 4A and 4B, logic 300 consists of latches 301–304, 306, 309, 314, 319, 321–323, 326 and 329, NOR gates 305, 307, 312 and 315, AND gates 308, 316 and 318, OR gates 313, 320, 325, and 330–332, NAND gates 324, master slave (MS) flip-flops 309, 317 and 328 and buffer 327. Latch 301 receives the BTM signal and is clocked by the phase2 (PH2) clock signal. The output of latch 301 is coupled to the input of latch 302. Latch 302 receives the phase1 (PH1). The output of latch 302 is coupled to the input of latch 303. Latch 303 receives the PH2 clock. The output of latch 303 is coupled to the input of latch 304 which receives and is coupled to the PH1 clock signal. The output of latch 304 is coupled to the input of OR gate 330. Another input of OR gate 330 is coupled to the output of latch 322 (the CICMDXD signal). The input of latch 322 is coupled to the CICMD signal. Latch 322 is clocked by the PH2 clock signal. The other input of OR gate 330 is coupled to the output of MS flip-flop 328 (the BUSYCNN signal). The clear input of MS flip-flop 328 is coupled to the output of buffer 327. The input of MS flip-flop 328 is tied to a high potential (i.e., a logical 1). MS flip-flop 328 is clocked by the phase 1 clock of the floating point unit, NPXPH1. The input of buffer 327 is coupled to the output of latch 326. The input of latch 326 is coupled to the output of NAND gate 324 (the FIDLENN signal). Latch 326 is clocked by the phase 1 clock of the floating point unit, NPXPH1.

One of the inputs to NAND gate 324 is coupled to the output of OR gate 320. The inputs of OR gate 320 are coupled to the FESBITNN signal and the BDFP signal. Another input of NAND gate 324 is coupled to the CMD [7:7] signal. Another input of NAND gate 320 is coupled to the inverted output of latch 319 (the BUSYIXD signal). Latch 319 is clocked by the phase2 clock signal of floating point unit, NPXPH2. The input of latch 319 is coupled to the BUSYI signal. Another input of NAND gate 324 is coupled to the inverted output of AND gate 318 (the FERROR1 signal). The inputs of AND gate 318 are coupled to the FERROR signal and the inverted BDFP signal. The last input of NAND gate 324 is coupled to the output of 321 (the LCEDGE1 signal). Latch 321 is clocked by the PH2 clock signal and its input is coupled to the output of MS flip-flop 317 (the LCEDGE1 signal). MS flip-flop 317 is clocked by the PH1 clock signal. The data input $D_{IN}$ of MS flip-flop 317 is coupled to a high potential (i.e., it is tied high). The clear input of MS flip-flop 317 is coupled to the output of NOR gate 305 (the FCLKGENNN signal). The enable input $D_{EN}$ of MS flip-flop 317 is coupled to the output of AND gate 316 (the LCNEXT3 signal).

The inputs of AND gate 316 are coupled to the output of NOR gate 315 and the output of NOR gate 305 (the FCLKGENNN signal). One of the inputs of NOR gate 305 is coupled with CNEWI signal. The other input of NOR gate 305 is coupled to CPNEWI signal. Another input of NOR gate 305 is coupled to the output of latch 306 (the BRESETA signal). The inputs of NOR gate 315 are coupled to the output of OR gate 313 (the LCNEXT1) and the inverted output of latch 314 (the LCNEXT2 signal). Latch 314 is clocked by the phase1 clock signal of the floating point unit, NPXPH1. The input of latch 314 is the output of OR gate 313 (the LCNEXT1 signal).

One of the inputs of OR gate 313 is coupled to the output of latch 311 (the CLMIXA signal). Latch 311 is clocked by the phase2 clock signal of the floating point unit, NPXPH2. The input of latch 311 is coupled to the CLMI signal. The other input of OR gate 313 is coupled to the output of NOR gate 312 (the GLCNI signal). One input of NOR gate 312 is coupled to the inverted output of latch 310 (the GLCNXA signal). Latch 310 is clocked by the phase2 clock signal of the floating point unit, NPXPH2. The input of latch 310 is coupled to the GLCN signal. The other input of NOR gate 312 is coupled to the output of MS flip-flop 309 (the GLCNCLK signal). MS flip-flop 309 is clocked by the PH2 clock signal. The clear input of MS flip-flop 309 is coupled to the inverted output of NOR gate 307. The data input $D_{IN}$ of MS flip-flop 309 is coupled to a high potential (i.e., it is tied high). The enable input DEN of MS flip-flop 309 is coupled to the output of AND gate 308. One input of AND gate 308 is coupled to the CNEWI signal. The other input of AND gate 308 is coupled to the output of NOR gate 307. One of the inputs of NOR gate 307 is the CLMI signal. The other input of NOR gate 307 is the output of latch 306 (the BRESETA signal). Latch 306 is clocked by PH1 clock signal. The input of latch 306 is coupled to BRESET signal.

The output of OR gate 330 is coupled to one of the inputs of OR gate 331. The other input of OR gate 331 is coupled to the output of latch 329 (the BNSTPDISXD signal). Latch 329 is clocked by the PH1 clock signal. The input of latch 329 is coupled to the BNSTPDIS signal. The output of OR gate 331 (the BUSYC2NN signal) is coupled to an inverted input of OR gate 332. The other input of OR gate 332 is coupled to the BUSYI signal. The output of OR gate 332 is the FBUSY signal.

The FCLKEN signal is the output of OR gate 325. One of the inputs of OR gate 325 is the output of NAND gate 324 (the FIDLENN signal). Another input of OR gate 325 is coupled to the output of latch 303 (the BTMXAAA signal). The last input of OR gate 325 is coupled to the output of latch 323 (the CIEMDXA signal). Latch 323 is clocked by the PH2 clock signal. The data input of latch 323 is coupled to the CICMD signal.

The two outputs of the stop clock logic of FIGS. 4A and 4B are the FCLKEN and the FBUSY signals. In the currently preferred embodiment, when the floating point enable signal (FCLKEN) is high, the clock to the floating point unit from the internal bus controller is enabled (i.e., the floating point clock is on). The FCLKEN signal is high when the microprocessor is in the built-in self-test mode, in the ICE mode or the floating point unit is executing a floating point instruction or preparing to execute a floating point instruction.

In the currently preferred embodiment, the clock enable signal FCLKEN is high when the output of OR gate 325 is high. Therefore, if any one of the inputs to OR gate 325 is high, the floating point clock will be on. When the BTM signal is high, indicating that the chip is in the built-in self-test mode, it propagates through latches 301, 302 and 303 on alternating PH2 and PH1 clock signals to the input of OR gate 325. Thus, the output of latch 303 (the BTMXAAA signal) is high at the second PH2 clock signal received and, thus causes FCLKEN signal to go high. Thus, any time the microprocessor chip is in built-in self-test mode, the floating point clock will be enabled.

The FBUSY signal is the output of OR gate 332. One of the inputs of OR gate 332 is the inverted output of OR gate 331 which receives one of its inputs from OR gate 330. One of the inputs to OR gates 330 is the BTM signal propagated through latches 301–304. Thus, when the BTM signal is high, indicating that chip is built-in self-test mode, one of the inputs to OR gate 330 becomes high. This causes the output of OR gate 331 to go high. When the output of OR gate 331 is high, the only input that is capable of influencing when the FBUSY signal is generated is the other input to OR gate 332, the BUSYI signal. Therefore, the FBUSY signal will only be generated when the BUSYI signal is high. Therefore, when in built-in self-test mode, the FBUSY signal only goes high when the BUSYI signal is high, thereby indicating that the floating point unit is busy executing a multi-clock instruction.

The FCLKEN signal is also high, causing the floating point clock to be enabled, when the microprocessor chip is in the ICE mode. When the microprocessor is in the ICE mode, the CICMD signal is high. When the CICMD signal is high, it is latched by latch 323 and output to OR gate 325 on the next occurrence of the PH2 clock signal. Thus, since one of the input of OR gate 325 is high, the output of OR gate 325 is high, forcing the floating point clock to remain on.

Similarly, when in the ICE mode, the CICMD signal is latched into latch 322 on the next occurrence of the PH1 clock signal. Then on the next occurrence of the PH1 clock signal, the CICMD signal is output from latch 322 into OR gate 330 which causes its output to go high. The output of OR gate 330 is input into OR gate 331, thereby causing the output of OR gate 331 to be high. When the output of OR gate 331 is high, it effectively disables one of the inputs to OR gate 332. Thus, the FBUSY signal will only be asserted when the BUSYI signal is high. The BUSYI signal is only high when the floating point unit receives a floating point instruction requiring multiple clocks for execution. Thus, when the microprocessor is in the ICE mode, the stop clock logic is disabled as indicated by the clock enable signal FCLKEN signal being high and the FBUSY signal is only asserted when the floating point unit is executing a multi-clock instruction occurs.

When a microprocessor is not in built-in self-test mode, or ICE mode the floating point clock can be disabled. In the currently preferred embodiment, the floating point clock is disabled when the output of NAND gate 324 is low. The output of NAND gate 324 is low when five conditions are met.

The first condition that is required for the clock to be disabled (i.e., FCLKEN signal being low) is if FESBITNN is a logical 1 (high). In this case, the clock may be stopped regardless of the BDFP signal. When the FESBITNN is active low, the clock may not be stopped unless the BDFP signal is high.

The second condition that must be met in order to disable the floating point clock is that there are no floating point operations on the bus. This is indicated by the CMD [7:7] signal which is a zero for all floating point operations. Therefore, if the signal is a 1, then there are no floating point operations. In this instance, the floating point clock can be disabled, assuming all of the other condition are met.

The third condition required for the floating point clock to be disabled is that the BUSYI signal be low. To reiterate, the BUSYI signal is low when the floating point unit is not currently executing the multi-cycle instruction. The BUSYI signal is latched through latch 319 which outputs the BUSYIXD signal. Thus, when the BUSYI signal is low, and assuming all of the remaining conditions are met, the floating point clock can be disabled.

The fourth condition that is required for the floating point clock to be disabled is that the FERROR1 signal be low. If the FERROR1 signal is active high, then the clock may not be stopped unless the BDFP signal is a logical 1 (high). If the FERROR1 signal is inactive, then the clock may be stopped regardless of the logic state of the BDFP signal.

The fifth requirement needed to disable the floating point clock is that the LCEDGE1 signal output from latch 321 be high. The LCEDGE 1 signal is high when the LCEDGE signal input into latch 321 is high and latch 321 is clocked by the PH2 clock signal. The LCEDGE signal output from MS flip-flop 317 will not be high if either the CNEWI or the CPNEWI signals are high or the output of latch 306 (the BRESETA signal) is high. The CNEWI or the CPNEWI signals are high when there is a new floating point instruction, either operational or pseudo, from the microcode unit. However, if there is not and the floating point unit is not being reset as indicated by the BRESET signal output from latch 306, then MS flip-flop 317 will not be cleared by the output of NOR gate 305 (the FCLKGENNN signal). Thus, the LCEDGE signal will be high if MS flip-flop 317 is enabled.

MS flip-flop 317 is enabled when the output of NOR gate 305 (the FCLKGENNN signal) is high and the output of NOR gate 315 are high. The output of NOR gate 315 will be high when the output of OR gate 313 (the LCNEXT1 signal) is high. The LCNEX 1 signal is high when the CLMI signal, indicating that the last micro-instruction for the current macro-instruction is occurring (i.e., the CLMIXA signal) is high. The CLMI signal is input to OR gate 313 from the output of latch 311. When the CLMI signal goes high, it is latch into latch 311 during the phase2 floating point clock signal, NPXPH2. The CLMIXA output signal from latch 311 is input to OR gate 313.

The LCNEXT1 signal is also high when the last cycle of the pseudo-floating point instruction occurs. When the last cycle of the pseudo-floating point instruction occurs, the GLCN signal goes high. The GLCN signal is then latched into latch 310 at the next NPXPH2 clock signal. The output of latch 310 is routed through the inverted input of NOR gate 312. The other input of NOR gate 312 is the CLCNCLK output from MS flip-flop 309. The GLCNCLK output of MS flip-flop 309 is high due to $D_{IN}$ being tied high unless it is cleared by its CLR input. Therefore, unless MS flip-flop 309 is cleared, its output is always high which causes the output of NOR gate 312 to be low. However, if the CLMI signal is low and the floating point unit is not being reset (BRESET is low), then MS flip-flop 309 is cleared by the output of NOR gate 307. In this case, the output of NOR gate 312 is high, causing LCNEXT1 to be high. When LCNEXT1 goes high, the input to NAND gate 324 is high, causing the FIDLENN signal to be low (assuming all of the other conditions are met). Therefore when the five conditions are met the clock can be disabled by forcing the FCLKEN signal when the output of NAND gate 324 does go low.

When the floating point clock is disabled, FBUSY must be generated. In the currently preferred embodiment, when FCLKEN goes low, the output of NAND gate 324 is latched into latch 326 to buffer 377 at the occurrence of the next floating point clock NPXPH1. This clears MS flip-flop 328. With the clearing of MS flip-flop 328, the input to OR gate 330 (the BUSYCNN signal) goes low. Assuming that the chip is not built-in self-test or the ICE mode, the output of OR gate 330 will be low. Thus, unless the stop clock logic is disabled (i.e., the BNSTPDISXD signal being high), the output of OR gate 331 will be low thereby forcing the output of OR gate 332 to be high (since it receives the output of OR gate 331 on an inverted input). When the output of OR gate 332 goes high, the FBUSY signal goes high. Thus, when the floating point clock signal is disabled (i.e., it goes low), then the FBUSY signal goes high.

Figure 5:
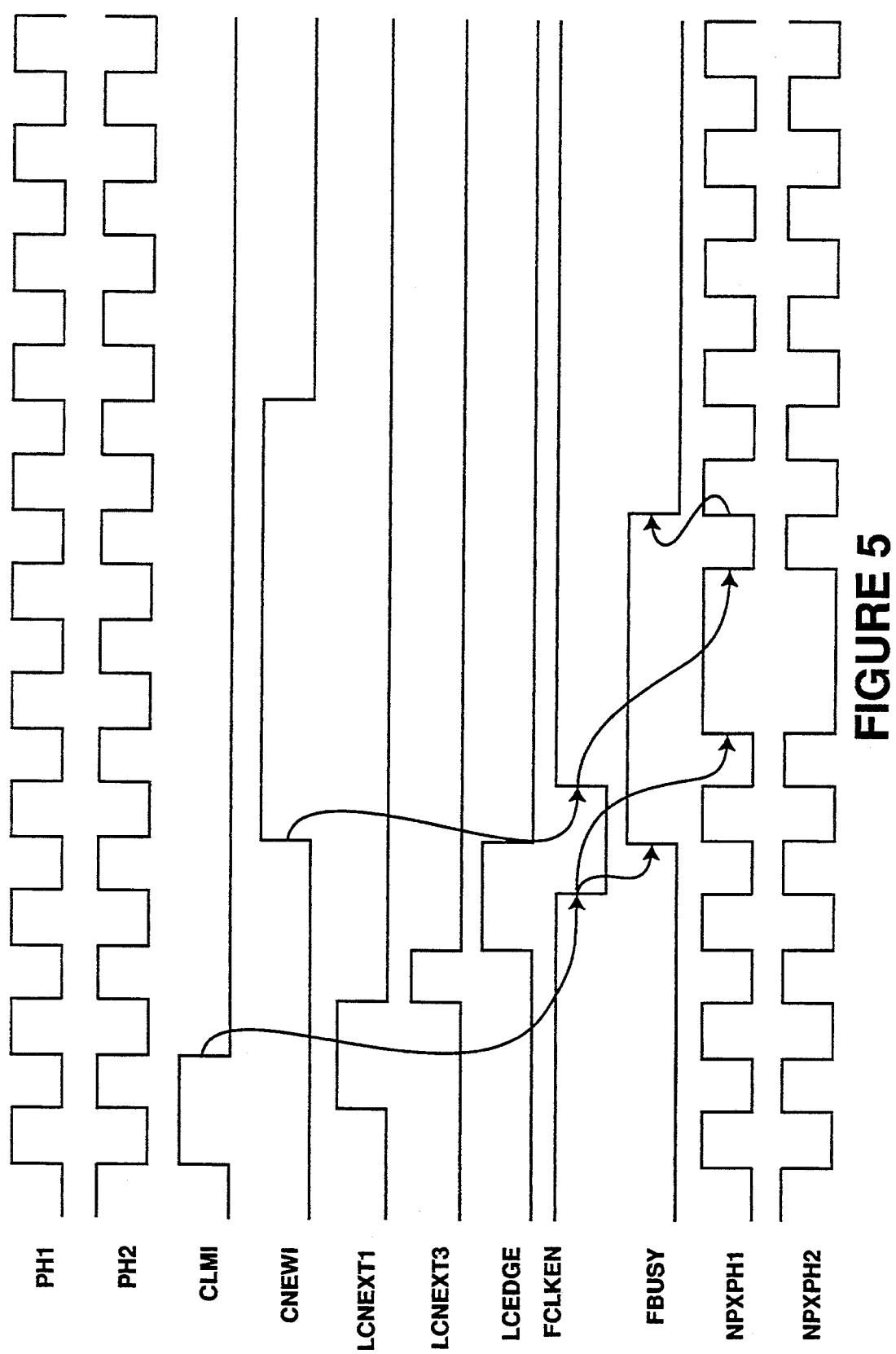
FIG. 5 is a timing diagram depicting the operation of the present invention.
Figure 6:
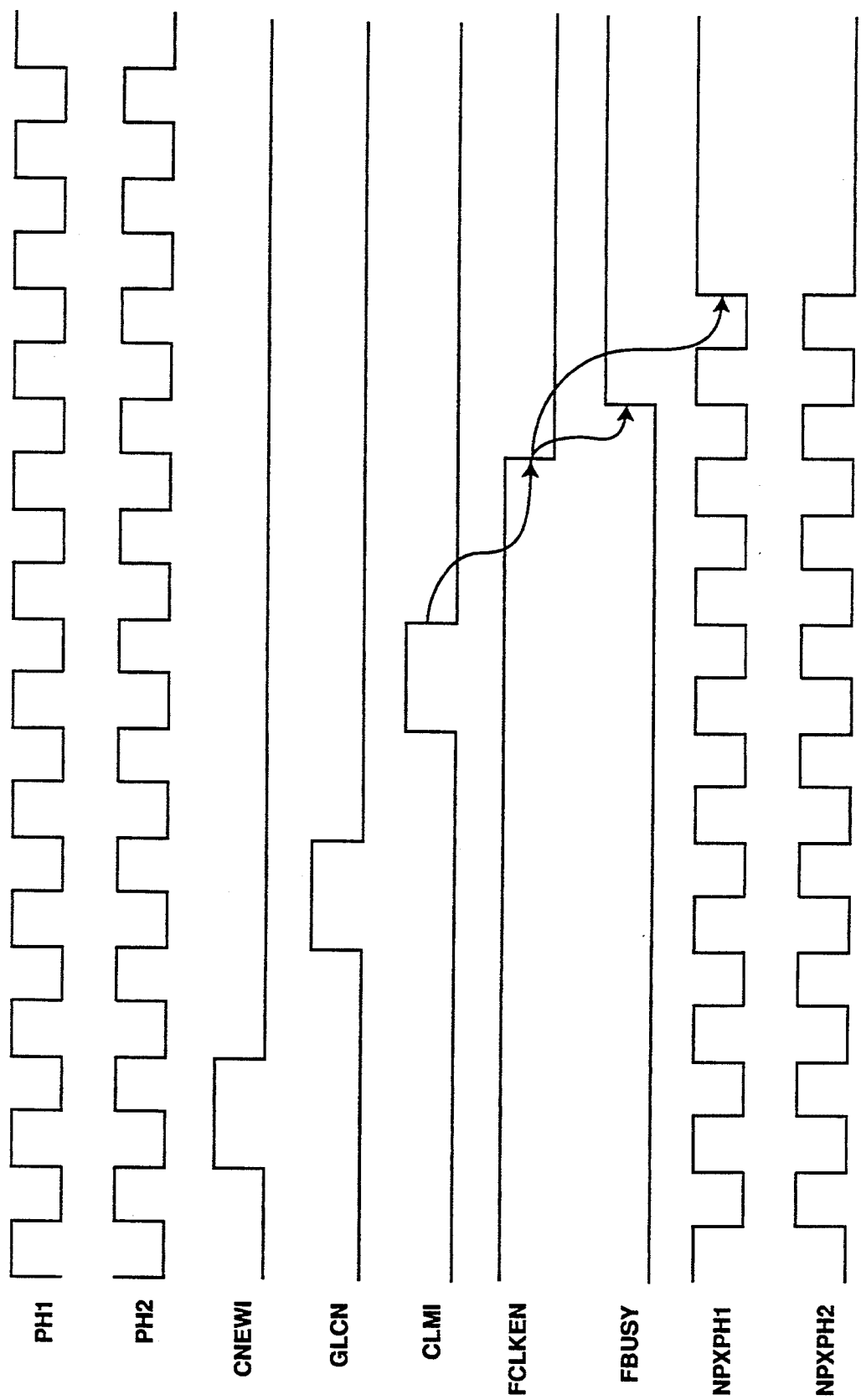
FIG. 6 is a timing diagram depicting the operation of the present invention.

The operation of FIG. 4 is further described in the timing diagrams of FIGS. 5 and 6. Referring to FIG. 5, PH1 and PH2 clocks of the microprocessor are shown. When the CLMI signal goes high, indicating the last micro-instruction for the current macro-instruction occurs, it causes the LCNEXT1 signal to go high (i.e., the output of OR gate 313). On the falling edge of LCNEXT1, the LCNEXT3 signal goes high (i.e., the output from AND gate 316). The falling edge of the LCNEXT3 signal causes the LCEDGE signal output from MS flip-flop 317 to go high. When LCEDGE signal goes high, it causes the FCLKEN signal to go low, thereby disabling the clock. Likewise, the FBUSY signal goes high at the rising edge of the next phased clock signal of the floating point unit, NPXPH1. Thus, the falling edge of the CLMI signal triggers the stopping of the clock.

When a new floating point instruction occurs, as indicated by the CNEWI signal going high, the clock is restarted as indicated by the FCLKEN signal going high. This causes the NPXPH1 clock to be restarted. The rising edge of the NPXPH1 clock coincides with the lowering of the FBUSY signal. Thus, the rising edge of the CNEWI signal starts the floating point unit clock. The operation and timing are the same for the CPNEWI and GLCN signals.

The timing diagram of FIG. 6 illustrates that the falling edge of this GLCN after the CNEWI signal does not stop the clock. As shown, the occurrence of the GLCN signal by itself does not stop the clock. The clock stops only after the falling edge of the CLMI signal. Again, the falling of the clock (i.e., the FCLKEN signal going low) also triggers the raising of the FBUSY signal.

Figure 7:
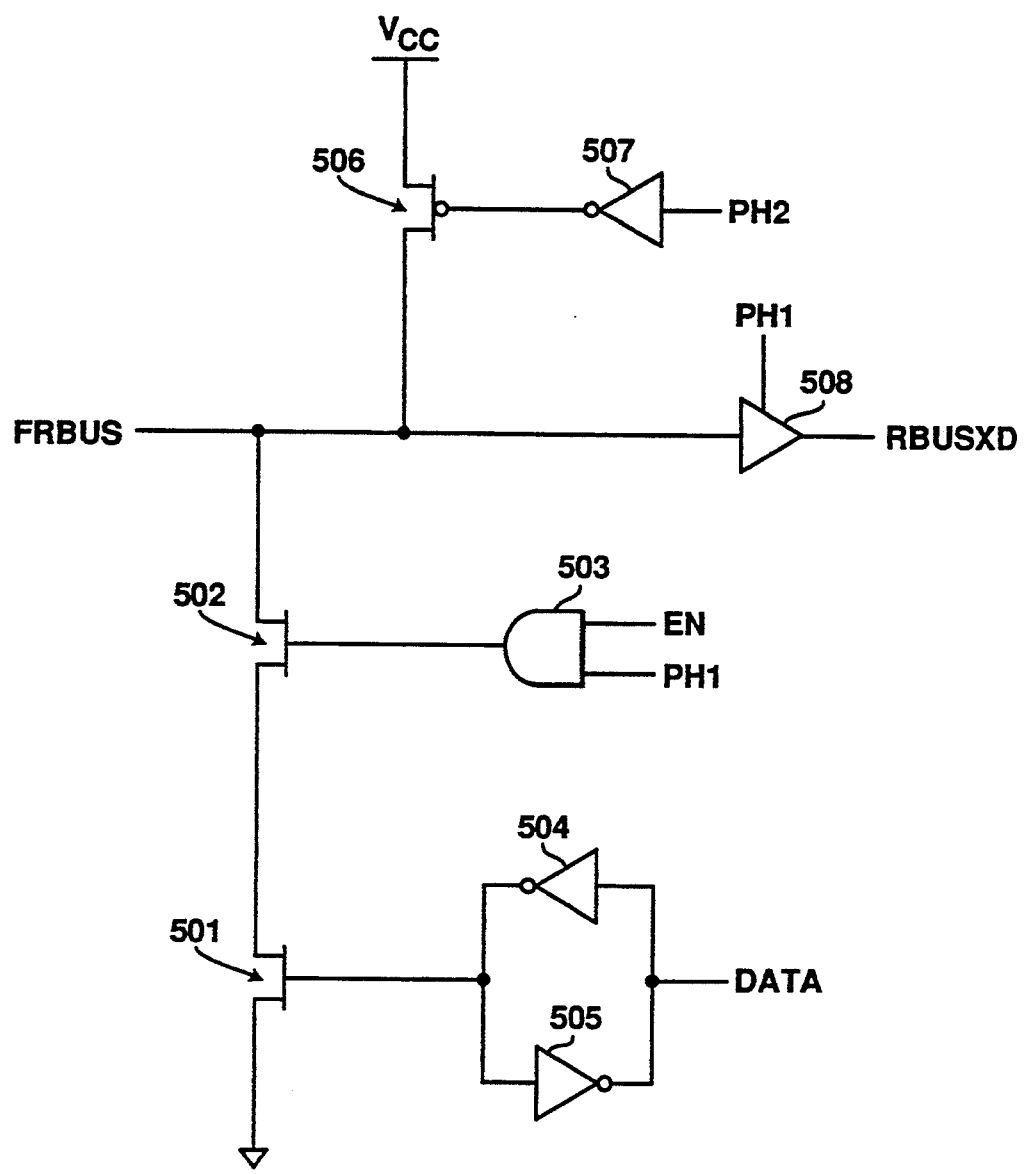
FIG. 7 is a circuit schematic of the circuitry of the common bus between the floating point unit and the microcode unit during the power down state.

It should be noted that in the currently preferred embodiment, the common bus between the floating unit and the microcode unit remains "on" during the floating point clock stoppage. The common bus remains on by being clocked by the PH1 and PH2 clock signals of the microprocessor. FIG. 7 illustrates the common bus circuitry of the floating point unit. In the currently preferred embodiment, the clocks which enable the data on the floating point unit bus are left running due to the fact that the microcode unit reads this bus even during the stop clock stage.

Referring to FIG. 7, the floating point unit bus, FRBUS is coupled to the drain of p-channel device 506. P-channel device 506 is coupled to and sourced by the power supply potential Vcc. The gate of device 506 is coupled to the output of inverter 507. The input of inverter 507 is coupled to the PH2 clock signal. The FRBUS is also coupled to the drain of n-channel device 502. N-channel device 502 is coupled to and sourced by the drain of n-channel device 501. The gate of device 502 is coupled to the output of AND gate 503. The inputs of AND gate 503 are coupled to the PH1 clock signal and an enable signal EN. Device 501 is coupled to and sourced by ground. The gate of device 501 is coupled to the output of inverter 504. The input of inverter 504 is coupled to the data signal and the output of inverter 505. The input of inverter 505 is coupled to the output of inverter 504 and the gate of device 501. FRBUS is coupled to the input of buffer 508 which is triggered by the PH1 clock signal. The output of buffer 508 is read as the RBUSXD bus by the microcode unit. In the currently preferred embodiment, all of the devices are metal-oxide semiconductor (MOS) transistors.

When the PH2 clock signal is high, device 506 turns on bringing FRBUS to the power supply potential. When the PH2 clock signal is low, device 506 does not conduct current. When the PH2 clock signal is high, the PH1 clock signal is low which turns off device 502 using the output of AND gate 503 such that device 502 does not conduct current. However, when the PH1 signal is high and the bus architecture is enabled via the EN signal, device 502 turns on. In this case if the data is a one, the output of inverter 504 will be a zero and device 501 will be off. However, if the data is a zero, the output of device 504 will be a one, thereby causing device 501 to turn on and pull FRBUS to ground. When FRBUS is grounded the output of bus is read low. The EN signal is high (enabled) according to the reason the bus is being utilized during the stop clock period.

The present invention supports predictive power management which is independent of software. The power consumption may be significantly reduced by stopping the clock to unused units in the microprocessor core. This invention allows power savings by automatically stopping the clock without user intervention and allows floating point clock to be restarted without stalling the microprocessor or introducing excessive wait and sees.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a mechanism and method for independently stopping and restarting the internal clock to a functional unit in an integrated circuit has been described.

We claim:

1. A mechanism for powering down a functional unit on an integrated circuit, wherein the functional unit is clocked by its own independent clock, said mechanism comprising:
   means for indicating to the functional unit whether the functional unit is required for use; and
   means for powering down the functional unit coupled to said means for indicating, wherein said means for powering down the functional unit comprises stop clock logic in the functional unit that powers down the functional unit transparent to and independent of any other functional units on the integrated circuit when the functional unit is not required for use, wherein the independent clock of the functional unit is stopped by the functional unit when the functional unit is not in use and automatically started by the functional unit when the functional unit is required for use.

2. The mechanism as defined in claim 1 wherein said means for powering down the functional unit comprises at least one signal.

3. The mechanism as defined in claim 2 wherein said at least one signal may be asserted and deasserted on a cycle-by-cycle basis.

4. The mechanism as defined in claim 1 further comprising means for enabling and disabling the means for powering down the functional unit.

5. The mechanism as defined in claim 4 wherein the means for enabling and disabling comprises at least one register bit.

6. The mechanism as defined in claim 1 wherein said means for indicating comprises means for indicating whether the functional unit is currently in use and means for indicating whether the functional unit is going to be performing its function, such that if the functional unit is not in use and is not going to be performing its function, then the functional unit is not required for use.

7. A mechanism for powering down a functional unit on an integrated circuit, wherein the functional unit is clocked by its own independent clock, said mechanism comprising:
   a first interface means for providing a first internal interface to detect when the functional unit is required for use; and
   a second interface means for providing a second internal interface between the functional unit and its independent clock to independently and automatically stop and restart the clock of the functional unit,
   means for indicating to the functional unit whether the functional unit is required for use; and
   means for powering down the functional unit coupled to said means for indicating, wherein said means for powering down the functional unit comprises stop clock logic in the functional unit that powers down the functional unit transparent to and independent of any other functional units on the integrated circuit when the functional unit is not required for use, wherein the independent clock of the functional unit is stopped by the functional unit when the functional unit is not in use and automatically started by the functional unit using the second internal interface when the functional unit is required for use.

8. The mechanism as defined in claim 7 wherein said first interface means comprises at least one signal.

9. The mechanism as defined in claim 8 wherein said first interface means includes a busy signal indicating that the functional unit is not ready for use, such that the busy signal is asserted until the clock is enabled.

10. The mechanism as defined in claim 7 wherein said second interface comprises a clock enable signal.

11. A mechanism for automatically powering down at least one of a plurality of functional units on an integrated circuit wherein said at least one functional unit executes instructions of a first type and further wherein said at least one functional unit is clocked by its own independent clock, said mechanism comprising:
   means for detecting whether a bus cycle to said at least one functional unit has occurred, wherein means for detecting includes means for determining whether an instruction of the first type is ready to be executed by said at least one functional unit and means for indicating to said at least one functional unit the results of the determination of said means for determining; and means in the functional unit for generating a clock enable signal to enable and disable the independent clock, such that the clock is stopped when said at least one functional unit is not required for executing instructions of the first type and automatically started when said at least one functional unit is required for executing instructions of the first type.

12. The mechanism as defined in claim 11 wherein the functional unit comprises a floating point unit and the instructions of the first type comprises floating point instructions.

13. The mechanism as defined in claim 11 wherein the means for determining comprises an instruction decoder and a microcode functional unit.

14. The mechanism as defined in claim 13 further comprising means to indicate to the decoder and microcode functional unit that said at least one functional unit is not ready to execute another instruction, wherein the mechanism indicates to the clock enable signal to enable the clock, such that when the clock is restarted the instruction decoder and microcode functional unit may continue.

15. The mechanism as defined in claim 14 wherein said means to indicate comprises a busy signal.

16. A method for powering down a functional unit on an integrated circuit, wherein the functional unit is clocked by its own independent clock, said method comprising the steps of:

indicating to the functional unit whether the functional unit is required for use; and powering down the functional unit transparent to and independent of any other functional units on the integrated circuit when the functional unit is not required for use, wherein the step of powering down the functional unit comprises the functional unit stopping the independent clock of the functional unit when the functional unit is not in use and the functional unit automatically starting the independent clock when the functional unit is required for use.

17. An integrated circuit for use in a computer system, said integrated circuit comprising:

a plurality of functional units, wherein the plurality of functional units performs operations in the integrated circuit; and a clock generator coupled to provide clock signals to the plurality of functional units, wherein the clock generator provides a clock signal to one of the plurality of functional units, wherein said one of the plurality of functional units includes stop clock logic that determines when said one of the plurality of functional units is required for use, and wherein the stop clock logic places a first signal coupled to the clock generator in a first logic state to enable the clock signal to said one of the plurality of functional units when said one of the plurality of functional units is required for use and places the first signal in a second logic state to disable the clock signal to said one of the plurality of functional units when said one of the plurality of functional units not required for use, such that the clock signal is enabled and disabled to said one of the plurality of functional units transparently to functional units other than said one of the plurality of functional units.

18. The integrated circuit defined in claim 17 wherein said one of the plurality of functional units is required for use when currently performing an operation or when being prepared for use.

19. The integrated circuit defined in claim 17 wherein said one of the plurality of functional units determines it is required for use in response to at least one signal generated externally to and received by said one of the plurality of functional units.

20. The integrated circuit defined in claim 19 wherein said at least one signal is generated in response to a bus cycle requesting use of said one of the plurality of functional units.

21. The integrated circuit defined in claim 19 wherein said at least one signal comprises an indication of the beginning and ending of an instruction.

22. The integrated circuit defined in claim 19 wherein the stop clock logic generates a second signal when disabling the clock signal to indicate said one of the plurality of functional units is not accepting new bus cycles.

23. The integrated circuit defined in claim 19 wherein the stop clock logic places the first signal in the first state to enable the clock signal in response to a new bus cycle after the clock signal has been disabled, wherein said one of the plurality of functional units maintains the second signal, such that one of the plurality of functional units does not accept the new bus cycle until enabling the clocks, at which time the second signal is de-asserted.

24. A processor for use in a computer system, said processor comprising:

a functional unit, wherein the functional unit performs a plurality of operations to provide at least one specific function; and a clock generator coupled to the functional unit, wherein the clock generator provides a clock signal to the functional unit, wherein the functional unit comprises a first logic circuit to perform idle detection internally and a second logic circuit responsive to the first logic circuit to provide an interface of at least one signal to the clock generator to enable said clock signal to the functional unit when the first logic circuit determines that the use of the functional unit is imminent or the functional unit is performing said at least one specific function, and disable said clock signal when use of the functional unit is not imminent and the functional unit is not performing said at least one specific function, such that the functional unit internally controls enabling and disabling the clock signal.

25. The processor defined in claim 24 wherein the first logic circuit includes circuitry to detect when a new bus cycle to the functional unit requests its use and when the new bus cycle has occurred, such that the first logic circuit determines use of the functional unit is imminent.

26. The processor defined in claim 24 further comprising a microcode unit coupled to the functional unit to indicate when a new bus cycle request for the functional unit has occurred, such that the first logic circuit determines use of the functional unit is imminent.

27. The processor defined in claim 24 further comprising a microcode unit coupled to the functional unit to indicate the beginning and ending of an instruction designated for the functional unit, wherein the first logic circuit determines the functional unit is not required for use when the instruction has ended and a new instruction is not prepared for execution, such that the second logic circuit disables the clock signal once the instruction has completed execution.

28. The processor defined in claim 24 wherein the functional unit asserts a busy signal to provide an indication external to the functional unit when the clock signal is disabled.

29. The processor defined in claim 28 wherein the functional unit enables the clock signal while asserting the busy signal, and then de-asserts the busy signal after the clock signal is enabled to the functional unit.

30. The processor defined in claim 24 wherein the second logic circuit enables and disables the clock signal on a cycle-by-cycle basis.

31. The processor defined in claim 24 further comprising an entry point programmable logic array (PLA), wherein the PLA outputs an indication signal in response to an instruction designated for the functional unit, and further wherein the second logic circuit enables the clock signal to the functional unit in response to the indication signal from the PLA.

32. The processor defined in claim 31 wherein the second logic circuit enables the clock to the functional unit at the same time the instruction arrives at the functional unit.

* * * * *

UNITED STATES PATENT AND TRADEMARK OFFICE
CERTIFICATE OF CORRECTION

PATENT NO. : 5,392,437
DATED : February 21, 1995
INVENTOR(S) : Matter et al.

It is certified that error appears in the above-identified patent and that said Letters Patent is hereby corrected as shown below:

In column 13 at line 37 delete "LCNEX 1" and insert --LCNEXT 1--

Signed and Sealed this

Thirty-first Day of December, 1996

Attest:

BRUCE LEHMAN

*Attesting Officer*　　　　*Commissioner of Patents and Trademarks*